(No Model.)
F. G. LILJA.
CALIPERS.
No. 310,292. Patented Jan. 6, 1885.
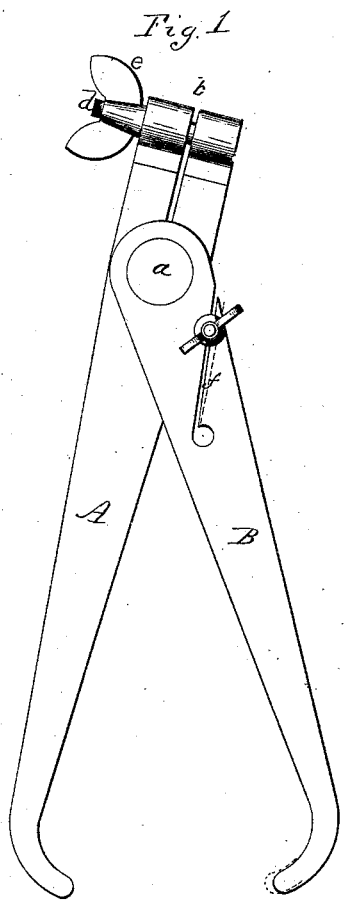
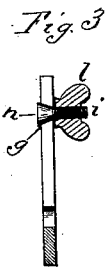
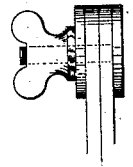
Witnesses
J. H. Shumway
Jos. C. Earle
Frank G Lilja
Inventor
By Atty
Wm C Earle

UNITED STATES PATENT OFFICE.

FRANK G. LILJA, OF SPRINGFIELD, MASSACHUSETTS.

CALIPERS.

SPECIFICATION forming part of Letters Patent No. 310,292, dated January 6, 1885.

Application filed September 15, 1884. (No model.)

*To all whom it may concern:*

Be it known that I, FRANK G. LILJA, of Springfield, in the county of Hampden and State of Massachusetts, have invented a new Improvement in Calipers; and I do hereby declare the following, when taken in connection with accompanying drawings and the letters of reference marked thereon, to be a full, clear, and exact description of the same, and which said drawings constitute part of this specification, and represent, in—

Figure 1, a side view of the calipers partially open; Fig. 2, edge view of the leg B, showing the pivot; Fig. 3, section of the leg B through the slit, showing the wedge in place; Fig. 4, modification.

This invention relates to an improvement in that class of calipers which are constructed for fine adjustment, the object being a cheap and durable construction which shall have a quick and ready general adjustment, with a fine auxiliary adjustment; and the invention consists in a pair of legs hung upon a pivot to swing readily toward or from each other, one of said legs constructed with a slit at right angles to the plane of its movement, combined with an adjustable wedge in said slit, whereby the leg may be sprung to gradually approach the other or recede therefrom, as more fully hereinafter described.

A represents the one leg, and B the other, the two pivoted together, as at $a$. The pivot should be made as a part of or rigidly fixed to the leg B, as seen in Fig. 2. The other leg is split above the pivot, as at $b$, and through the two split ends a set-screw, $d$, is arranged, with a thumb-nut, $e$, by which the split ends may be clamped upon the pivot, and so as to hold the two legs at any position to which they may be set with relation to each other. The legs are preferably made from thin flat steel. The leg B is constructed with a slit, $f$, from its outside inward and downward near the pivot, the slit inclined so as to approach the opposite side, but stopping short of it. Near the outer or open end of the slit a recess, $g$, is made through the slit, and into this recess a corresponding wedge, $h$, is arranged, extending through to the opposite side, where it forms a screw, $i$. Into this screw a thumb-nut, $l$, is arranged, and so that the wedge may be drawn inward or permitted to move outward. When drawn in, it spreads the outer end of the slit $f$ and correspondingly bends the leg, as indicated in broken lines, Fig. 1. This bending of the leg produces the fine adjustment. The spreading of the slit may be very slow, and so that the finest adjustment may be made in the most perfect manner; or the slit having been thus spread, the nut may be released, permitting the wedge to return and the leg to return by its own elasticity to close the slit $f$, producing the same quality of adjustment. The general adjustment is made by loosening the nut $e$ and turning the legs near the required distance from each other. Then set the nut $e$ to clamp the two legs in that position. From that general position the legs may be adjusted with relation to each other by the wedge $h$. This construction is very cheap when the fine adjustment is considered, and the legs are very strong and rigid when set. The legs lying one upon the other, they may be turned one over the other, so that the same calipers serve for both inside and out and with the same nicety of adjustment. The slit $f$ and its adjusting-wedge may be applied to either leg. In the illustration I show it as applied to the leg upon which the pivot is fixed.

While I prefer to extend one leg above the pivot and there divide it to make a clamp upon the pivot, the pivot may terminate on one side in the form of a screw, as seen in Fig. 4, and there provided with a thumb-nut, as shown. I therefore do not limit my invention to the leg A, having its upper end divided as a clamp.

I claim—

1. Calipers consisting of the two legs A B, pivoted together, the one constructed with a slit, $f$, opening from one side and extending toward the opposite side, combined with the wedge $h$, arranged through said slit with its nut $l$, substantially as described.

2. Calipers consisting of the legs A B, pivoted together, the one leg A extending above the pivot, divided, combined with the screw $d$ and nut $e$, as a clamp to set the legs A upon the pivot, the leg B constructed with a slit, $f$, opening from one side and extending toward the opposite side, and with the wedge $h$ and nut $l$, substantially as specified.

FRANK G. LILJA.

Witnesses:
LORIN ALDRICH,
HOMER D. PACKARD.